United States Patent
Batarseh et al.

(10) Patent No.: US 7,646,116 B2
(45) Date of Patent: Jan. 12, 2010

(54) METHOD AND SYSTEM FOR BALANCING POWER DISTRIBUTION IN DC TO DC POWER CONVERSION

(75) Inventors: Issa Batarseh, Orlando, FL (US);
Hussam Al-Atrash, Oviedo, FL (US);
Khalid Rustom, Orlando, FL (US)

(73) Assignee: Petra Solar Inc., South Plainfield, NJ (US)

( * ) Notice: Subject to any disclaimer, the term of this patent is extended or adjusted under 35 U.S.C. 154(b) by 0 days.

(21) Appl. No.: 12/154,213

(22) Filed: May 22, 2008

(65) Prior Publication Data

US 2009/0289502 A1  Nov. 26, 2009

(51) Int. Cl.
*H02J 1/00* (2006.01)
(52) U.S. Cl. ....................................................... 307/82
(58) Field of Classification Search .................... 307/82
See application file for complete search history.

(56) References Cited

U.S. PATENT DOCUMENTS

| | | | |
|---|---|---|---|
| 5,327,071 A | 7/1994 | Frederick et al. | |
| 6,137,274 A | 10/2000 | Rajagopalan | |
| 6,606,343 B2 | 8/2003 | Zeira et al. | |
| 2008/0164766 A1 * | 7/2008 | Adest et al. | 307/80 |

OTHER PUBLICATIONS

PCT International Search Report, mailed Jul. 7, 2009.
PCT Written Opinion of the International Searching Authority, mailed Jul. 7, 2009.

* cited by examiner

*Primary Examiner*—Robert L. Deberadinis

(57) ABSTRACT

A method for balancing power distribution in a direct current to direct current (DC to DC) power-conversion system is provided. The power-conversion system includes a plurality of channels that are connected to a load. The channels are also connected to corresponding power sources. The method, at a first channel, includes obtaining a first power, which is the maximum power of the power source connected to the first channel. Further, the method includes computing a reference power based on the power output of the channels. Furthermore, the method includes outputting the reference power when the first power is greater than or equal to the reference power, and outputting the first power when the first power is less than the reference power.

21 Claims, 7 Drawing Sheets

METHOD AND SYSTEM FOR BALANCING POWER DISTRIBUTION IN DC TO DC POWER CONVERSION

FIELD OF THE INVENTION

The invention relates generally to direct current to direct current (DC to DC) power-conversion systems. More specifically, it relates to balancing of power-distribution in a DC to DC power-conversion system that includes channels connected in parallel.

BACKGROUND

A DC to DC converter converts a direct current (DC) input voltage from a DC power source into a DC output voltage. Examples of DC power sources include, but are not limited to, a battery, a DC generator, a rectifier, and the like. The DC to DC converter can be used to feed a DC load, provide noise isolation, and regulate a power bus. Examples of the DC load include, but are not limited to, DC motors, battery charging circuits, integrated circuits, and the like. The DC to DC converter and the DC power source are often included in a channel that is capable of feeding a DC load.

A single DC to DC converter often faces a problem related to failure of power sources in power-conversion systems. Further, a required load may not always correspond to the wattage of a single commercial-off-the-shelf (COTS) DC to DC converter. In the presently known art, the problems above are solved through the use of DC to DC converters connected in parallel. The DC to DC converters, which are connected in parallel, are included in a channel to feed a DC load.

It is also known in the art that for better reliability, more than one channel can be used by connecting them in a parallel configuration.

Channels connected in a parallel configuration to supply an output power to a DC load often encounter the problem of uneven distribution of the output power among the channels. Uneven distribution of the output power may result in low life expectancies or less reliability of components included in the channels, among other problems. Therefore, there is a need for a method and a system for balancing the distribution of the output power in power-conversion systems that include channels connected in parallel.

The existing methods for balancing the distribution of the output power have one or more of the following disadvantages. These methods are based on the assumptions that the channels are supplied by a single power source. Further, most of these methods require a master channel to control operation of the channels.

In light of foregoing, there is a need for a method and a system for balancing the distribution of output power in DC to DC power-conversion systems in which all the channels are not supplied by a single power source. Further, there is a need for a method and a system for master-less control of the distribution of output power in DC to DC power-conversion systems.

SUMMARY

In an embodiment of the present invention, a method for balancing power distribution in a direct current to direct current (DC to DC) power-conversion system is provided. The power-conversion system includes a plurality of channels that are connected to a load. The channels are also connected to corresponding power sources. The method includes obtaining at a first channel a first power, which is the maximum power of the power source connected to the first channel.

Further, the method includes computing a reference power based on the power output of the channels. Furthermore, the method includes outputting the first power when the reference power is greater than or equal to the first power, and outputting the reference power when the reference power is less than the first power.

In another embodiment of the present invention, a method of balancing power-distribution in a DC to DC power-conversion system is provided. The DC to DC power-conversion system includes channels that are connected to a load. The channels are also connected to corresponding power sources. The method includes determining at a first channel a first current, based on a load current required at the load. Further, the method includes obtaining a first power, which is the maximum power of the power source connected to the first channel. Furthermore, the method includes determining a threshold current corresponding to the first power. The method also includes outputting the first power when the first current is greater than or equal to the threshold current, and outputting a power corresponding to the load current when the first current is less than the threshold current. Further, the method includes computing a reference power based on the power output of the channels. Furthermore, the method includes outputting the first power when the reference power is greater than or equal to the first power, and outputting the reference power when the reference power is less than the first power.

In yet another embodiment of the present invention, a power-conversion system for DC to DC power conversion is provided. The DC to DC power-conversion system includes channels that are connected to a load. The channels are also connected to corresponding power sources that provide power input to the channels. The channels include DC to DC converters that are connected to power sources. The DC to DC converters are configured to convert power input provided by the power sources into power output based on a reference power. The channels further include mode controllers that are configured to compute the reference power based on power outputs of the channels. The DC to DC power-conversion system further includes a communication path that is capable of enabling communication between the mode controllers.

BRIEF DESCRIPTION OF THE DRAWINGS

The preferred embodiments of the invention will hereinafter be described in conjunction with the appended drawings, provided to illustrate and not to limit the invention, wherein like designations denote like elements, and in which.

DETAILED DESCRIPTION OF THE INVENTION

While the preferred embodiments of the invention have been illustrated and described, it will be clear that the invention is not only limited to these embodiments. Numerous modifications, changes, variations, substitutions and equivalents will be apparent to those skilled in the art without departing from the spirit and scope of the invention.

The invention provides a system and a method for balancing power distribution in a DC to DC power-conversion system that includes a plurality of channels connected in parallel, such that each channel is supplied by independent power sources. The system and the method utilize interconnected mode controllers included in each of the channels for balancing power distribution.

Figure 1:
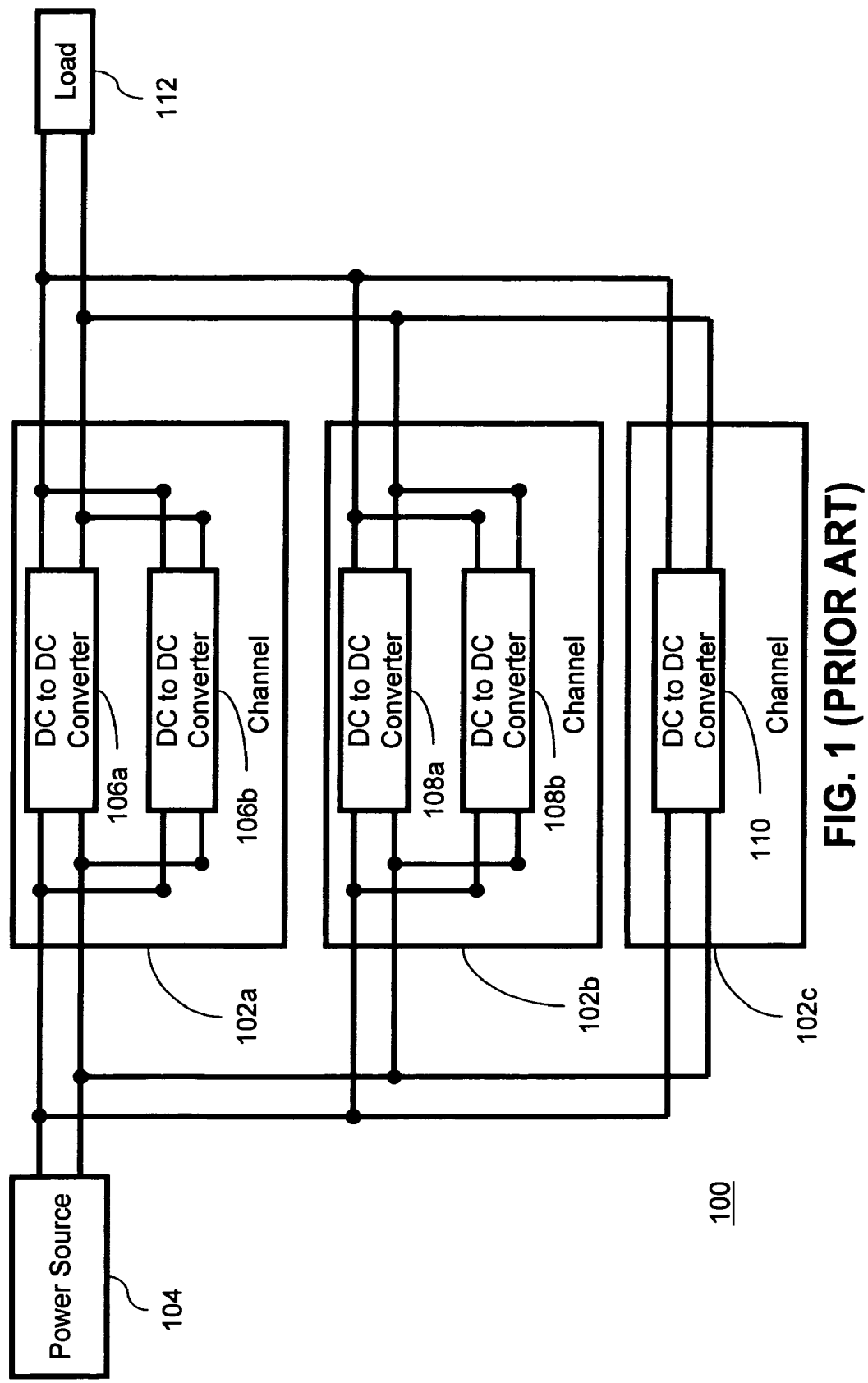
FIG. 1 is a block diagram illustrating a DC to DC power-conversion system in accordance with the state of the art prior to the present invention.

FIG. 1 is a block diagram illustrating a DC to DC power-conversion system 100, in accordance with the state of the art prior to the present invention. DC to DC power-conversion system 100, hereinafter being referred to as system 100, can include a plurality of channels connected in parallel. For the purpose of this description, system 100 is shown to include channels 102a, 102b and 102c. System 100 also includes a power source 104. Examples of power sources include, but are not limited to, solar panels, DC generators, batteries, and the like. Power source 104 provides power input to channels 102a, 102b and 102c. Each of the channels 102a, 102b and 102c can include one or more DC to DC converters to convert the power input into a power output. For the purpose of this description, channel 102a is shown to include DC to DC converters 106a and 106b, channel 102b is shown to include DC to DC converters 108a and 108b, and channel 102c is shown to include a DC to DC converter 110. The power output from DC to DC converters 106a, 106b, 108a, 108b and 110 are supplied to a DC load 112.

System 100 is shown to include a single power source 104. Therefore, it poses a problem in the event of the failure of power source 104. Further, system 100 is not suitable for power-conversion systems that include more than one power source. An example of a power-conversion system that includes more than one power source is a satellite that receives power from solar panels. A satellite generally includes more than one solar panel, which are activated in turns depending on the direction of sunlight.

Figure 2:
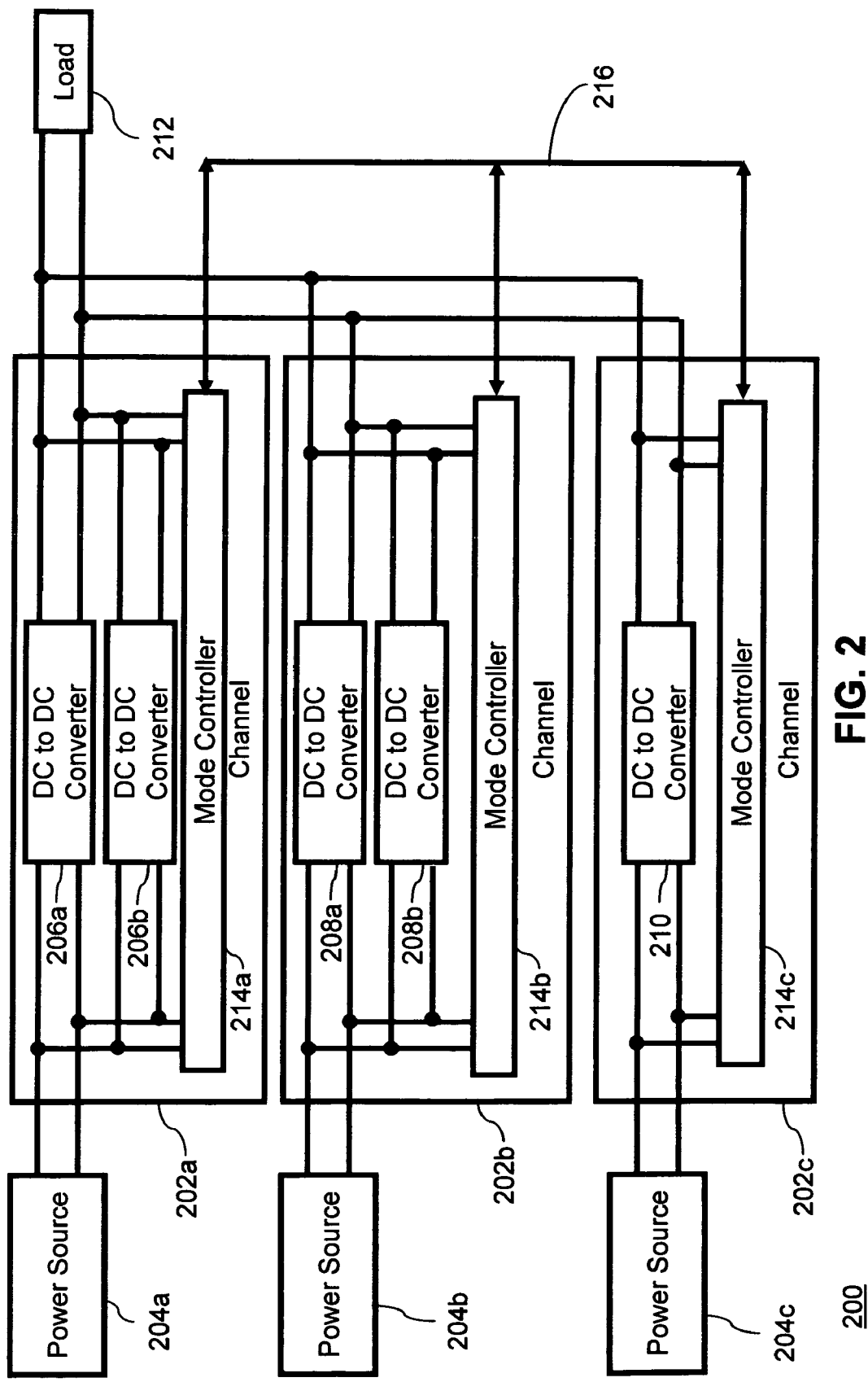
FIG. 2 is a block diagram illustrating a DC to DC power-conversion system in accordance with an embodiment of the present invention.

FIG. 2 is a block diagram illustrating a DC to DC power-conversion system 200 in accordance with an embodiment of the present invention. Those skilled in the art will appreciate that DC to DC power-conversion system 200 may include all or even a fewer number of components than the components shown in FIG. 2. Further, those with ordinary skill in the art will understand that DC to DC power-conversion system 200 may include additional components that are not shown here and are not germane to the operation of DC to DC power-conversion system 200, in accordance with the inventive arrangements. DC to DC power-conversion system 200, hereinafter being referred to as system 200, can include a plurality of channels connected in parallel. In an embodiment, the DC to DC power-conversion system 200 can be a solar power conversion system. For the purpose of this description, system 200 is shown to include channels 202a, 202b and 202c. Each of the channels 202a, 202b and 202c receives power from a corresponding power source. For the purpose of this description, channels 202a, 202b and 202c are shown to include corresponding power sources 204a, 204b and 204c, respectively. Each of the channels 202a, 202b and 202c can include one or more DC to DC converters to convert the power input into a power output. For the purpose of this description, channel 202a is shown to include DC to DC converters 206a and 206b, channel 202b is shown to include DC to DC converters 208a and 208b, and channel 202c is shown to include a DC to DC converter 210. The power output of DC to DC converters 206a, 206b, 208a, 208b and 210 is supplied to a DC load 212.

Channels 202a, 202b and 202c further include mode controllers 214a, 214b and 214c, respectively. These mode controllers are configured to determine the power output of DC to DC converters included in corresponding channels.

For example, mode controller 214a determines the power output of DC to DC converters 206a and 206b included in channel 202a. Similarly, mode controller 214b determines the power output of DC to DC converters 208a and 208b, and mode controller 214c determines the power output of DC to DC converter 210.

For each channel, the mode controller included in the channel determines the mode of operation of the DC to DC converters included in the channel based on the maximum input power supplied by the power source to the DC to DC converters and a reference power. The maximum input power is variable, based on various conditions. For example, in case the power input is supplied by a solar panel, the maximum input power will depend upon the direction of sunlight. The mode of operation of the DC to DC converters determines their power output. In system 200, for example, mode controller 214a determines the mode of operation of DC to DC converters 206a and 206b, based on the maximum input power supplied by power source 204a and a reference power. DC to DC converters 206a and 206b operate in the maximum power point tracking mode (MPPT) when the reference power is greater than or equal to the maximum input power. DC to DC converters 206a and 206b operate in the output voltage regulation (OVR) mode when reference power is less than the maximum input power. DC to DC converters 206a and 206b output the maximum input power in the MPPT mode and output the reference power in the OVR mode.

Mode controller 214a calculates the reference power based on values of power received over a communication channel 216. The values of power correspond to power outputs of those DC to DC converters, out of DC to DC converters 206a, 206b, 208a, 208b, and 210, which operate in OVR mode. Communication channel 216 is configured to facilitate communication between mode controllers 214a, 214b and 214c.

Examples of a communication channel include, but are not limited to, Ethernet, CAN bus, optical cable, wireless, and the like. In system 200, communication channel 216 facilitates sharing of power outputs of corresponding DC to DC converters between mode controllers 214a, 214b and 214c. Each mode controller broadcasts a value of the reference power when the DC to DC converter corresponding to the mode controller operates in the OVR mode and outputs the reference power. Mode controller 214a calculates the reference power by performing an arithmetic operation on values of power received over communication channel 216. The values of power correspond to power outputs of those DC to DC converters among DC to DC converters 206a, 206b, 208a, 208b, and 210 that operate in OVR mode.

Examples of the arithmetic operation on the values of power include, but are not limited to, the average of the values of power, the weighted average of the values of power, and the like.

In one embodiment of the present invention, the reference power is computed at regular time intervals. In another embodiment, the reference power is computed every time a value of power is received over the communication channel.

Figure 3:
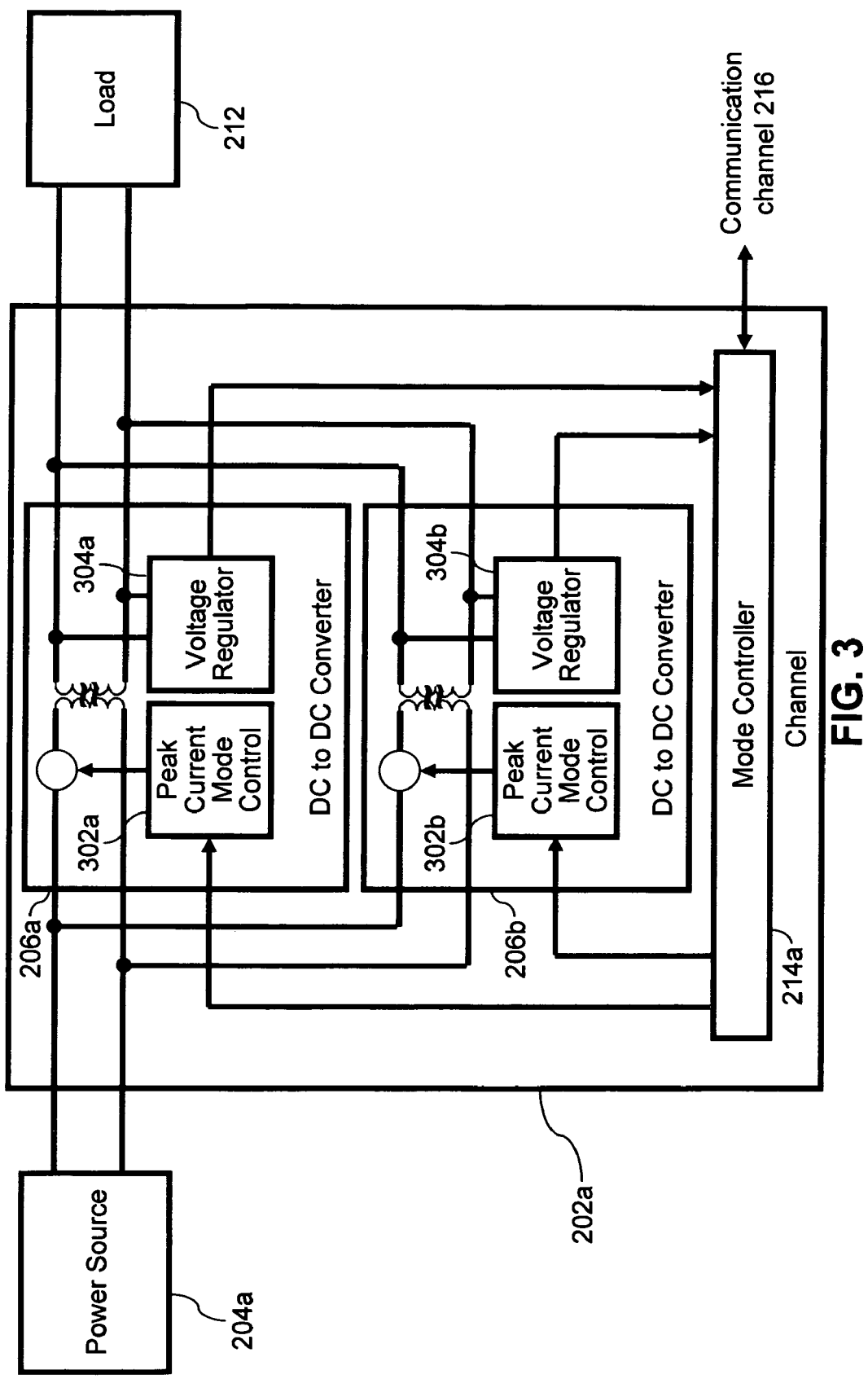
FIG. 3 is a block diagram illustrating components of a channel in accordance with another embodiment of the present invention.

FIG. 3 is a block diagram illustrating various components of channel 202a in accordance with an embodiment of the present invention. Those skilled in the art will appreciate that channel 202a may include all or even a fewer number of components than the components shown in FIG. 3. Further, those with ordinary skill in the art will understand that channel 202a may include additional components that are not shown here and are not germane to the operation of channel 202a, in accordance with the inventive arrangements. Channel 202a includes power source 204a to provide an input power to channel 202a. Channel 202a further includes DC to DC converters 206a and 206b to convert the input power provided by power source 204a into a power output. The power output is supplied to DC load 212. Channel 202a also includes mode controller 214a to determine the mode of operation and control the power outputs of DC to DC converters 206a and 206b. Mode controller 214a also broadcasts the value of the reference power of DC to DC converters 206a and 206b when the DC to DC converters 206a and 206b operate in the OVR mode and output the reference power. Further, the mode controllers do not broadcast a power output when the DC to DC converters operate in MPPT mode.

According to an embodiment of the invention, DC to DC converters 206a and 206b are current-mode-controlled (CMC) DC to DC converters. DC to DC converters 206a and 206b include peak current mode control modules 302a and 302b, respectively. Peak current modules 302a and 302b are configured to control current outputs of DC to DC converters 206a and 206b, respectively. DC to DC converters 206a and 206b further include output voltage regulators 304a and 304b, respectively. Voltage regulators 304a and 304b are configured to maintain voltage outputs of DC to DC converters 206a and 206b at a constant value, which is consistent with a voltage required at load, when the DC to DC converters 206a and 206b operate in the OVR mode. Voltage regulators 304a and 304b are switched off when DC to DC converters 206a and 206b operate in the MPPT mode.

Peak current mode control modules 302a and 302b control the output voltages and output currents of DC to DC converters 206a and 206b according to the mode of operation of DC to DC converters 206a and 206b. The mode of operation of DC to DC converters 206a and 206b is determined by mode controller 214a.

Figure 4:
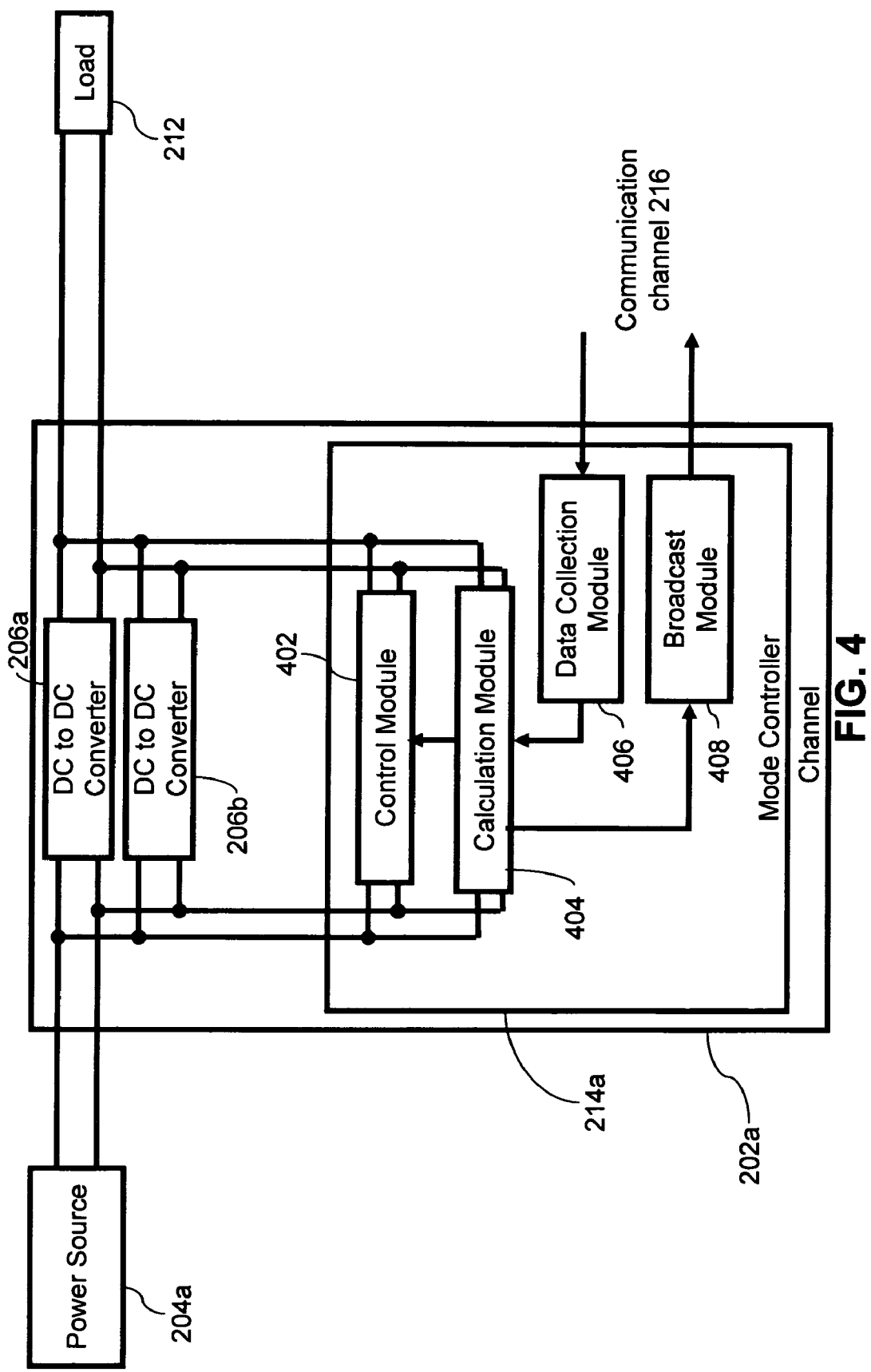
FIG. 4 is a block diagram illustrating components of a mode controller in accordance with another embodiment of the present invention.

FIG. 4 is a block diagram illustrating the components of mode controller 214a in accordance with an embodiment of the present invention. Those skilled in the art will appreciate that mode controller 214a may include all or even a fewer number of components than the components shown in FIG. 4. Further, those with ordinary skill in the art will understand that mode controller 214a may include additional components that are not shown here and are not germane to the operation of mode controller 214a in accordance with the inventive arrangements.

Mode controller 214a includes a control module 402 that determines the mode of operation of DC to DC converters 206a and 206b based on the maximum input power supplied by power source 204a and the reference power. Control module 402 further sends commands to DC to DC converters 206a and 206b to control the voltage outputs and the current outputs of DC to DC converters 206a and 206b.

Mode controller 214a includes a calculation module 404 to calculate the reference power. Calculation module 404 calculates the reference power by performing an arithmetic operation on values of power received over communication channel 216. The values of power received over communication channel corresponds to power outputs of those DC to DC converters, out of DC to DC converters 206a, 206b, 208a, 208b and 210, which operate in OVR mode.

Calculation module 404 calculates the reference power iteratively. According to an embodiment of the invention, the reference power is calculated iteratively at regular intervals of time. According to another embodiment of the invention, the reference power is calculated each time a value of power is received over the communication channel.

Examples of the arithmetic operation on the values of power include, but are not limited to, average of the values of power, weighted average of the values of power and the like. In one embodiment of the present invention, the reference power is computed at regular time intervals. In another embodiment, the reference power is computed every time a value of power is received over the communication channel.

Mode controller 214a also includes a data collection module 406 that collects the power outputs broadcast over communication channel 216.

Mode controller 214a further includes a broadcasting module 408 that broadcast a value of the reference power of DC to DC converters 206a and 206b over communication channel 216 when DC to DC converters 206a and 206b operate in the OVR mode.

Control module 402 determines the mode of operation of DC to DC converters 206a and 206b based on the reference power and the maximum power supplied by power source 204a only when at least one value of power is broadcast over communication channel 216 to facilitate calculation of the reference power. In case no value of power is broadcast over communication channel 216, control module 402 determines the mode of operation of DC to DC converters 206a and 206b based on the maximum power supplied by power source 204a and the load current required at load 212. DC to DC converters 206a and 206b operate in the MPPT mode when the load current required at load 212 is greater than or equal to a threshold current corresponding to the maximum power supplied by power source 204a. DC to DC converters 206a and 206b operate in the OVR mode when the load current required at load 212 is less than the threshold current corresponding to the maximum power supplied by power source 204a. DC to DC converters 206a and 206b output the maximum power supplied by power source 204a when DC to DC converters 206a and 206b operate in the MPPT mode. DC to DC converters 206a and 206b output a power corresponding to the load current required at load 212 when DC to DC converters 206a and 206b operate in OVR mode.

It will be apparent to those skilled in the art that the system can be implemented as a combination of one or more embodiments as described above. Further, the embodiments described above are for the purpose of illustration and not to limit the scope of the invention. Various alternative embodiments of the present invention may be readily apparent to those with ordinary skill in the art.

Figure 5:
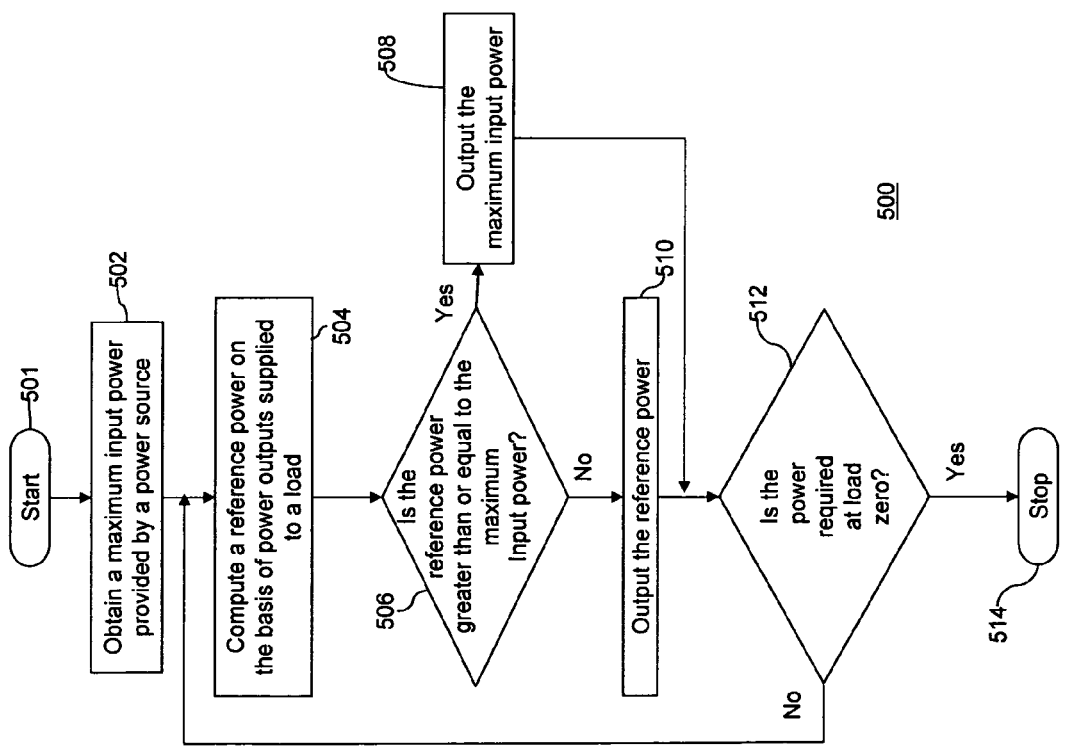
FIG. 5 is a flowchart of a method for balancing the load in a DC to DC power-conversion system in accordance with another embodiment of the present invention.

FIG. 5 is a flowchart 500 of a method for balancing power distribution in a DC to DC power-conversion system in accordance with an embodiment of the present invention. The DC to DC power-conversion system includes a plurality of channels connected in parallel. The channels are connected to a DC load, and supply their respective power outputs to the DC load. Each channel includes a power source that provides power input to the channel. Each of the channels further include one or more DC to DC converters that convert the power input into the power output supplied to the DC load.

The method for balancing power distribution is preferably the same for all the channels. Therefore, for the purpose of this description, the method has been explained for a single channel.

The method for balancing power distribution is initiated at step 501. At step 502, a mode controller included in the channel determines the maximum input power supplied by a power source included in the channel. For example, in system 200, mode controller 214a determines the maximum input power supplied by power source 204a.

At step 504, the mode controller computes a reference power. The reference power for DC to DC converters included in the channel is computed based on the power outputs supplied to the load. According to an embodiment of the invention, the reference power is calculated iteratively at regular intervals of time. According to another embodiment of the invention, the reference power is calculated each time a value of power is received over the communication channel.

For example, in system 200, mode controller 214a computes the reference power for DC to DC converters 206a and 206b based on the values of power received over communication channel 216. The values of power received over communication channel 216 correspond to power outputs of those DC to DC converters, out of DC to DC converters 206a, 206b, 208a, 208b and 210, which operate in OVR mode.

At step 506, the mode controller compares the reference power and the maximum input power supplied by power source 204a to determine the mode of operation of the DC to DC converters. The DC to DC converters operate in the maximum power point tracking (MPPT) mode when the reference power is greater than or equal to the maximum input power. The DC to DC converters operate in the output voltage regulation (OVR) mode when the reference power is less than the maximum input power. For example, in system 200, mode controller 214a determines the mode of operation of DC to DC converters 206a and 206b, based on the reference power for DC to DC converters 206a and 206b and the maximum input powers supplied by power source 204a. DC to DC converters 206a and 206b operate in the MPPT mode when the reference power for DC to DC converters 206a and 206b is greater than or equal to the maximum input power supplied by power source 204a. DC to DC converters 206a and 206b operate in the OVR mode when the reference power for DC to DC converters 206a and 206b is less than the maximum input power supplied by power source 204a.

When the DC to DC converters operate in the MPPT mode, step 508 is performed. At step 508, the DC to DC converters output the maximum input power. After step 508, step 512 is performed. For example, in system 200, DC to DC converters 206a and 206b output the maximum input power supplied by power source 204a when DC to DC converters 206a and 206b operate in the MPPT mode.

When the DC to DC converters operate in the OVR mode, step 510 is performed. At step 510, the DC to DC converters output the reference power. After step 510, step 512 is performed. For example, in system 200, DC to DC converters 206a and 206b output the reference power for DC to DC converters 206a and 206b when DC to DC converters 206a and 206b operate in the OVR mode.

At step 512, the power required by the load is compared with zero to check if the plurality of channels need to provide power to the load. If the power required by the load equals zero, step 514 is performed. If the power required by the load does not equal zero, step 504 is performed again and the reference power is calculated. At step 514, the method is terminated.

Figure 6:
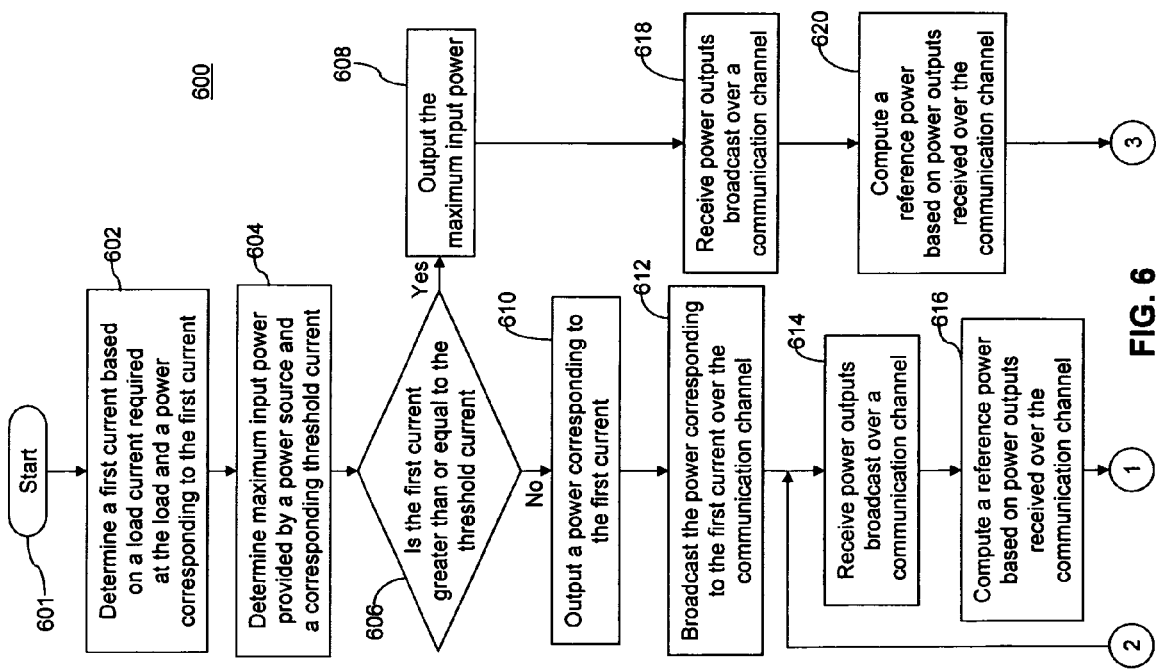
FIGS. 6 and 7 depict a flowchart of a method for balancing the load in a-DC to DC power-conversion system in accordance with yet another embodiment of the present invention.
Figure 7:
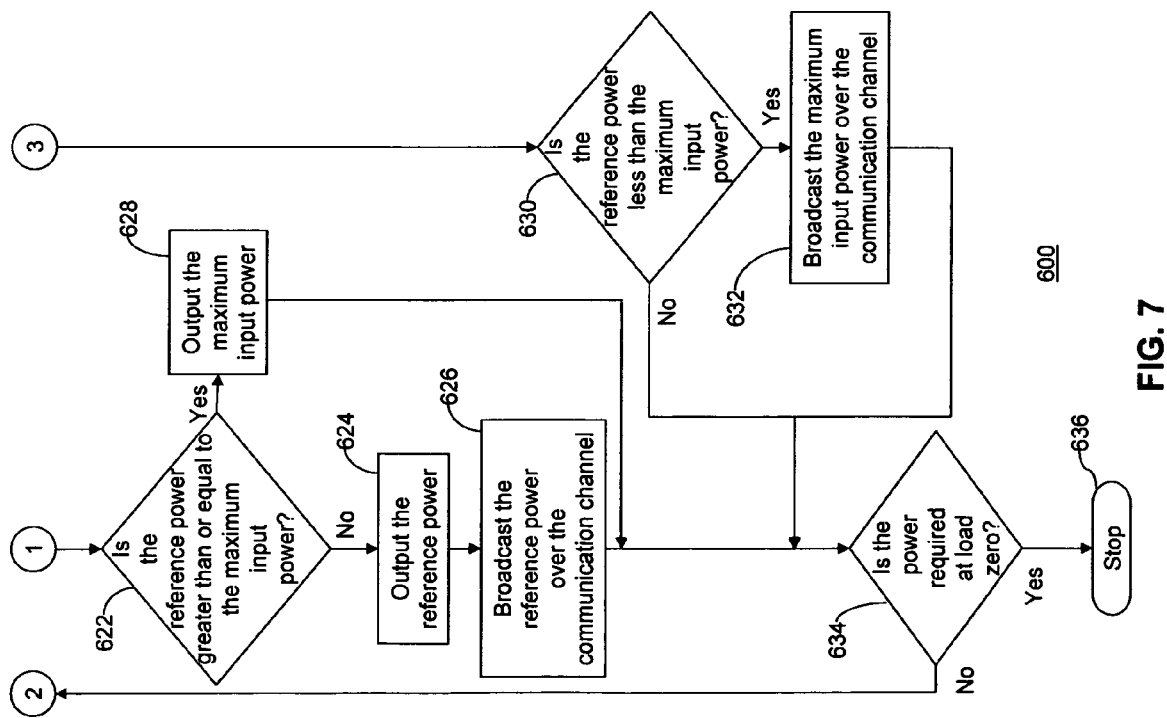

FIGS. 6 and 7 depict a flowchart 600 of a method for balancing the load in a DC to DC power-conversion system in accordance with yet another embodiment of the present invention. The DC to DC power-conversion system includes a plurality of channels connected in parallel. The method for balancing power distribution is preferably the same for all the channels. Therefore, for the purpose of this description, the method has been explained for a single channel.

The method for balancing power distribution is initiated at step 601. At step 602, a mode controller included in the channel determines a first current based on the load current required at a load. Further, at step 602, the mode controller determines a power corresponding to the load current. For example, in system 200, mode controller 214a determines the load current and corresponding power required at load 212.

At step 604, the mode controller determines a maximum input power supplied by a power source included in the channel. The power source supplies the power input to the DC to DC converters included in the channel. Further, at step 604, the mode controller determines a threshold current corresponding to the maximum input power supplied by the power source. This is the maximum current that can be provided by the DC to DC converters while keeping the output voltage constant. The threshold current will depend on the voltage required at the output of the DC to DC converters and the maximum input power. For example, in system 200, mode controller 214a determines a maximum input power and corresponding threshold current supplied by power source 204a to DC to DC converters 206a and 206b.

At step 606, the mode controller compares the threshold current and the first current to determine the mode of operation of the DC to DC converters. For example, in system 200, mode controller 214a determines the mode of operation of DC to DC converters 206a and 206b by comparing the threshold current and the load current at load 212.

If at step 606, the first current is determined to be greater than or equal to the threshold current the DC to DC converters operate in the maximum power point tracking (MPPT) mode. In the MPPT mode, the DC to DC converters operate according to step 608. At step 608, the DC to DC converters output the maximum input power. For example, in system 200, DC to DC converters 206a and 206b operate in the MPPT mode when the load current at load 212 is greater than or equal to the threshold current. In the MPPT mode, DC to DC converters 206a and 206b output the maximum input power supplied by power source 204a.

After step 608, step 618, step 620 and step 630 are performed in that order. At step 618, the mode controller receives values of power broadcast over the communication channel. After step 618, step 620 is performed. At step 620, the mode controller computes a reference power based on the values of power received over the communication channel. After step 620, step 630 is performed. At step 630, the reference power is compared with the maximum input power. If at step 630 the reference power is determined to be less than the maximum input power, step 632 is performed. At step 632, a value of the maximum input power is broadcast over the communication channel. After step 630, step 634 is performed to check if the channels need to provide power to the load. If at step 630, the reference power is determined to be not less than the maximum input power, step 634 is performed.

If at step 606 the first current is determined to be less than the threshold current, the DC to DC converters operate in the output voltage regulation (OVR) mode according to step 610. At step 610, the DC to DC converters output a power corresponding to the first current (i.e., the power required by the load).

After step 610, step 612, step 614, step 616 and step 622 are performed in that order. At step 612, the mode controller broadcasts a value of the power corresponding to the first current over the communication channel.

The communication channel is configured to enable communication between the mode controllers included in the channels that are connected in parallel. After step 612, step 614 is performed. For example, in system 200, DC to DC converters 206a and 206b operate in the OVR mode when the load current at load 212 is less than the threshold current. In the OVR mode, DC to DC converters 206a and 206b output a power corresponding to the load current at load 212. At step 614, the mode controller receives values of power broadcast over the communication channel. After step 614, step 616 is performed.

At step 616, the mode controller computes a reference power based on the values of power received over the communication channel. The mode controller computes the reference power by calculating the average of the values of power received over the communication channel, in accordance with an embodiment of the invention. The reference power can also be computed by performing other arithmetic operations on the values of power received over the communication channel including, but not limited to, the weighted average, the statistical median, the statistical mode, the geometric mean, and the like. For example, in system 200, mode controller 214a computes the reference power for DC to DC converters 206a and 206b by calculating the average of the values of power corresponding to power outputs of those DC to DC converters, out of DC to DC converters 206a, 206b, 208a, 208b and 210, which operate in OVR mode, received over communication channel 216. After step 616, step 622 is performed.

At step 622, the mode controller compares the reference power and the maximum input power to determine the mode of operation of the DC to DC converters. If at step 622, the reference power is determined to be greater than or equal to the maximum input power, the DC to DC converters operate in the MPPT mode and output power according to step 628. At step 628, the DC to DC converters output the maximum input power. For example, in system 200, DC to DC converters 206a and 206b operate in the MPPT mode when the reference power for DC to DC converters 206a and 206b is greater than or equal to the maximum input power supplied by power source 204a. In the MPPT mode, DC to DC converters 206a and 206b output the maximum input power supplied by power source 204a. After step 628, step 634 is performed to check if the plurality of channels need to provide power to the load. If at step 622, the reference power is determined to be less than the maximum input power, the DC to DC converters operate in the OVR mode and operate according to step 624. At step 624, the DC to DC converters output the reference power and further perform step 626. At step 626, the mode controller broadcasts value of the reference power over the communication channel. After step 626, step 634 is performed.

For example, in system 200, DC to DC converters 206a and 206b operate in the OVR mode when the reference power for DC to DC converters 206a and 206b is less than the maximum input supplied by power source 204a. In the OVR mode, DC to DC converters 206a and 206b output the reference power for DC to DC converters 206a and 206b. Mode controller 214a broadcasts a value of the reference power for DC to DC converters 206a and 206b over communication channel 216 when DC to DC converters 206a and 206b operate in the OVR mode.

In one embodiment of the present invention, the reference power is computed at regular time intervals. In another embodiment, the reference power is computed every time a value of power is received over the communication channel.

At step 634, the power required by the load is compared with zero to check if the plurality of channels need to provide power to the load. If the power required by the load equals zero, step 636 is performed. If the power required by the load does not equal zero, step 614 is again performed.

At step 636, the method is terminated.

To aid in better understanding the method described in FIG. 6, an exemplary method is illustrated, based on DC to DC power-conversion system 200 that is described in FIG. 2. In the exemplary method, the maximum input power supplied by power sources 214a, 214b and 214c is taken as 4 kW, 8 kW and 10 kW respectively. Further, the total power required at load 212 is taken as 12 kW. Further, the order of initiation of methods at channels 202a, 202b and 202c is channel 202a followed by channel 202b, further followed by channel 202c.

The method is initiated at channel 202a, and at initiation the power required from the channel 202a is 12 kW, which is equal to the total power required by load 212. After initiation, mode controller 214a determines a first load current corresponding to 12 KW, according to step 602. Further, mode controller 214a determines a threshold current corresponding to 4 kW, which is the maximum input power supplied by power source 204a to channel 202a, according to step 604. Mode controller 214a then compares the first load current and the threshold current, according to step 606. As the first load current is greater than the threshold current, DC to DC converters 206a and 206b operate in the MPPT mode, according to step 608. In the MPPT mode, the power output of DC to DC converters 206a and 206b equals 4 kW, which is the maximum input supplied to DC to DC converters 206a and 206b by power source 204a.

Thereafter, the method is initiated at channel 202b, and the power required from channel 202b is 8 kW since 4 kW out of the total required power of 12 kW is being supplied by channel 202a. After initiation, mode controller 214b determines a second load current corresponding to 8 kW, which is the power required from channel 202b, according to step 602. Further, mode controller 214b also determines a threshold current corresponding to 8 kW, which is the maximum input power supplied by power source 204b to channel 202b, according to step 604. Mode controller 214b then compares the second load current and the threshold current, according to step 606. As the second load current, in this case, is equal to the threshold current, DC to DC converters 208a and 208b operate in the MPPT mode, according to step 608. In the MPPT mode, the power output of DC to DC converters 208a and 208b equals 8 kW, which is the maximum input power supplied by power source 204b to DC to DC converters 208a and 208b.

Thereafter, the method is initiated at channel 202c, where the power required from channel 202c is zero as the total power of 12 kW required by load 212 is already supplied by channels 202a and 202b. After initiation, mode controller 214c determines a third load current corresponding to zero power, which is the power required from channel 202c, according to step 602. Also, mode controller 214c determines a threshold current corresponding to 10 kW, which is the maximum input power supplied by power source 204c to channel 202c, according to step 604. As the third load current, in this case, is less than the threshold current, DC to DC converter 210 operates in the OVR mode, according to step 610. In the OVR mode, the power output of DC to DC converter 210 equals zero as the total power of 12 kW required by load 212 is already supplied by channels 202a and 202b.

As DC to DC converter 210 operates in the OVR mode, mode controller 214c broadcasts the value of the power output of DC to DC converter 210, which is zero kW, over communication channel 216, according to step 612.

Thereafter, mode controllers 214a, 214b and 214c receive values of power outputs broadcast over communication channel 216. Mode controllers 214a and 214b receive values of power outputs according to step 618, as DC to DC converters 206a, 206b, 208a and 208b operate in MPPT mode. Mode controller 214c receives values of power outputs according to step 614, as DC to DC converter 210 operates in the OVR mode.

Further, mode controllers 214a, 214b and 214c compute the reference power for channels 202a, 202b and 202c, respectively, based on power outputs broadcast over communication channel 216. Mode controllers 214a and 214b compute the reference power according to step 620. Mode controller 214c computes the reference power according to step 616.

As only channel 202c is operating in the OVR mode, the power output is broadcast only by channel 202c. Further, since the power output for channel 202c is zero, the reference power computed by mode controllers 214a, 214b and 214c comes out to be zero.

Thereafter, mode controllers 214a, 214b and 214c compare the reference power with corresponding maximum input powers.

Mode controllers 214a and 214b compare the reference power with corresponding maximum input powers according to step 630. As DC to DC converters 206a and 206b are operating in MPPT mode and the reference power is less than the maximum input power supplied by power source 204a, DC to DC converters 206a and 206b start operating in the OVR mode and mode controller 214a will broadcast a value of the power output by DC to DC converters 206a and 206b, which is 4 kW, over communication channel 216, according to step 632.

Similarly, as DC to DC converters 208a and 208b are operating in MPPT mode and the reference power becomes less than the maximum input power supplied by power source 204b, DC to DC converters 208a and 208b start operating in the OVR mode with power output of 8 kW. As DC to DC converters 208a and 208b start operating in the OVR mode, mode controller 214b will broadcast 8 kW, which is the power output of DC to DC converters 208a and 208b, over communication channel 216, according to step 632.

Further, in the exemplary method mode controllers 214a, 214b and 214c compute the reference power at regular time intervals.

Mode controller 214c, then, compares the reference power with maximum input power supplied by power source 204c, according to step 622. As DC to DC converter 210 is operating in OVR mode and the reference power, 0 kW, is less than the maximum input power supplied by power source 204c, 10 kW, DC to DC converter 210 start operating in the OVR mode and DC to DC converter 210 outputs 0 kW, which is equal to the reference power, according to step 624. Further, mode controller 214c will broadcast a value of the power output by DC to DC converter 210, which is 0 kW, over communication channel 216, according to step 626.

Thereafter, mode controllers 214a, 214b and 214c check if the power required at load 212 is zero, according to step 634. As the power required at load 212 is 12 kW, mode controllers 214a, 214b and 214c receive power broadcast over communication channel 216, according to step 614. Further, mode controllers 214a, 214b and 214c compute the reference power according to step 616. The reference power is computed based on the broadcasted power output of 4 kW, 8 kW and 0 kW. In the exemplary method, the reference power is the average of broadcasted power output, i.e., 4 kW, 8 kW and 0 kW. Consequently, the reference power comes out to be 4 kW.

Thereafter, mode controller 214a determines the mode of operation of DC to DC converters 206a and 206b, mode controller 214b determines the mode of operation of DC to DC converters 208a and 208b, and mode controller 214c determines the mode of operation of DC to DC converters 210, based on 4 kW as reference power, according to step 622. DC to DC converters 206a and 206b will operate in the MPPT mode as the maximum input power supplied by power source 204a is 4 kW which equals the reference power of 4 kW, according to step 628. DC to DC converters 208a and 208b will operate in the OVR mode as the reference power of 4 kW is less than 8 kW, which is the maximum input power supplied by power source 204b, according to step 624. DC to DC converter 210 will operate in the OVR mode as the reference power of 4 kW is less than 12 kW, which is the maximum input power supplied by power source 204c, according to step 624.

In accordance with the present invention, the method and the system for balancing power distribution provides various advantages. For example, the present invention facilitates the use of independent power sources in the channels that provide reliability and efficient utilization of the components used in the system. Further, the present invention eliminates the need to provide a master to control the operation of DC to DC converters. Furthermore, balancing of power distribution results in the higher life expectancy of the components used in the system.

What is claimed is:

1. A method of balancing power-distribution in a direct current to direct current (DC to DC) power-conversion system, the power-conversion system comprising a plurality of channels connected to a load, the plurality of channels connected to a corresponding plurality of power sources, the method comprising:
    determining a first current based on a load current required at the load and a plurality of currents provided by the plurality of channels to the load, wherein the plurality of currents correspond to power outputs provided by the plurality of channels to the load;
    outputting a first power when the first current is at least equal to a first threshold, wherein the first power is a maximum power of a first power source of the plurality of power sources, and wherein the first power source is connected to a first channel of the plurality of channels;
    outputting a second power when the first current is less than the first threshold, wherein the second power is calculated based on the first current;
    computing a reference power based on at least one power output of a plurality of power outputs, wherein the plurality of power outputs correspond to the plurality of channels;
    outputting the first power when the reference power is at least equal to the first power; and
    outputting the reference power when the reference power is less than the first power.

2. The method according to claim 1 further comprising broadcasting a value of the reference power over a communication path when the first channel outputs the reference power, wherein the communication path enables communication between the plurality of channels.

3. The method according to claim 1, wherein the step of computing the reference power is performed iteratively.

4. The method according to claim 3 further comprising broadcasting a value of the first power over a communication path when the first channel outputs the first power and the reference power is less than the first power, wherein the communication path enables communication between the plurality of channels.

5. The method according to claim 1, wherein the step of computing the reference power comprises:
  receiving at least one value of power corresponding to the at least one power output, wherein the at least one value of power is received through a broadcast over a communication path; and
  calculating the reference power on the basis of an average of the at least one value of power, wherein the communication path enables communication between the plurality of channels.

6. The method according to claim 1, wherein the step of computing the reference power comprises:
  receiving at least one value of power corresponding to the at least one power output, wherein the at least one value of power is received through a broadcast over a communication path; and
  calculating the reference power on the basis of a weighted average power of the at least one value of power, wherein the communication path enables communication between the plurality of channels.

7. The method according to claim 1, wherein the step of computing the reference power comprises:
  receiving at least one value of power corresponding to the at least one power output, wherein the at least one value of power is received through a broadcast over a communication path; and
  calculating the reference power on the basis of an arithmetic operation on the at least one value of power, wherein the communication path enables communication between the plurality of channels.

8. A method of balancing power-distribution in a direct current to direct current (DC to DC) power-conversion system, the power-conversion system comprising a plurality of channels connected to a load, the plurality of channels connected to a corresponding plurality of power sources, the method comprising:
  obtaining a first power, the first power being a maximum power of a first power source, wherein the first power source is connected to a first channel of the plurality of channels;
  computing a reference power based on at least one power output of a plurality of power outputs, wherein the plurality of power outputs correspond to the plurality of channels;
  outputting the first power when the reference power is at least equal to the first power; and
  outputting the reference power when the reference power is less than the first power.

9. The method according to claim 8 further comprising broadcasting a value of the reference power over a communication path when the first channel outputs the reference power, and wherein the communication path enables communication between the plurality of channels.

10. The method according to claim 8, wherein the step of computing the reference power is performed iteratively.

11. The method according to claim 10 further comprising broadcasting a value of the first power over a communication path when the first channel outputs the first power and the reference power is less than the first power.

12. The method according to claim 8, wherein the step of computing the reference power comprises:
  receiving at least one value of power corresponding to the at least one power output, wherein the at least one value of power is received through a broadcast over a communication path; and
  calculating the reference power on the basis of an average of the at least one value of power, wherein the communication path enables communication between the plurality of channels.

13. The method according to claim 8, wherein the step of computing the reference power comprises:
  receiving at least one value of power corresponding to the at least one power output, wherein the at least one value of power is received through a broadcast over a communication path; and
  calculating the reference power on the basis of a weighted average power of the at least one value of power, wherein the communication path enables communication between the plurality of channels.

14. The method according to claim 8, wherein the step of computing the reference power comprises:
  receiving at least one value of power corresponding to the at least one power output, wherein the at least one value of power is received through a broadcast over a communication path; and
  calculating the reference power on the basis of an arithmetic operation on the at least one value of power, wherein the communication enables communication between the plurality of channels.

15. A power-conversion system for direct current to direct current (DC to DC) power conversion, the power-conversion system comprising:
  a plurality of channels, the plurality of channels capable of supplying power to a load, wherein each channel of the plurality of channels comprises:
    a power source, the power source providing an input power to the channel;
    one or more DC to DC converters, each DC to DC converter of the one or more DC to DC converters being connected to the power source, wherein the each DC to DC converter is configured to convert the input power to an output power based on a reference power;
    a mode controller, the mode controller being connected to the one or more DC to DC converters, wherein the mode controller is configured to compute the reference power based on a plurality of power outputs corresponding to the plurality of channels; and
  a communication path, the communication path enabling communication between the plurality of channels.

16. The power-conversion system according to claim 15, wherein the mode controller comprises a calculation module, the calculation module being capable of computing the reference power.

17. The power-conversion system according to claim 15, wherein each channel of the plurality of channels comprises a broadcasting module, the broadcasting module being capable of broadcasting a value over the communication path, wherein the value is based on at least one of the input power and reference power.

18. The power-conversion system according to claim 15, wherein each channel of the plurality of channels comprises a data collection module, the data collection module being capable of receiving at least one value broadcast over the communication path, wherein each of the at least one value correspond to a power output of the plurality of power outputs.

19. The power-conversion system according to claim 15, wherein the mode controller is further configured to control the output power of the one or more DC to DC converters.

20. The power-conversion system according to claim 15, wherein the each DC to DC converter is a current-mode-controlled DC to DC converter.

21. The power-conversion system according to claim 15, wherein the power conversion system is a solar power conversion system.

* * * * *